US007418164B2

(12) United States Patent
Joodaki

(10) Patent No.: US 7,418,164 B2
(45) Date of Patent: Aug. 26, 2008

(54) METHOD FOR FORMING A PHOTONIC BAND-GAP STRUCTURE AND A DEVICE FABRICATED IN ACCORDANCE WITH SUCH A METHOD

(75) Inventor: Mojtaba Joodaki, Munich (DE)

(73) Assignee: ATMEL Germany GmbH, Heilbronn (DE)

( * ) Notice: Subject to any disclaimer, the term of this patent is extended or adjusted under 35 U.S.C. 154(b) by 233 days.

(21) Appl. No.: 11/121,990

(22) Filed: May 5, 2005

(65) Prior Publication Data

US 2005/0250232 A1 Nov. 10, 2005

(30) Foreign Application Priority Data

May 5, 2004 (DE) ........................ 10 2004 022 140

(51) Int. Cl.
*G02B 6/12* (2006.01)
*G02B 6/10* (2006.01)

(52) U.S. Cl. ........................................ 385/14; 385/129

(58) Field of Classification Search .................. 385/14, 385/129

See application file for complete search history.

(56) References Cited

U.S. PATENT DOCUMENTS

| | | | | |
|---|---|---|---|---|
| 6,577,211 | B1 * | 6/2003 | Tsujiguchi | 333/204 |
| 7,075,610 | B2 * | 7/2006 | Scalora et al. | 349/147 |
| 2002/0021479 | A1 * | 2/2002 | Scalora et al. | 359/241 |
| 2005/0053319 | A1 * | 3/2005 | Doan | 385/14 |
| 2005/0058415 | A1 * | 3/2005 | Lee et al. | 385/122 |
| 2005/0058416 | A1 * | 3/2005 | Hoon Lee et al. | 385/122 |

OTHER PUBLICATIONS

S.J. Kim et al., " *An Inversely Tapered Corrugated CPW*," 33rd European Microwave Conference, Oct. 7, 2003; pp. 239-240; XP010680849. ISBN: 1-58053-835-5.

Kuang-Ping Ma et al., "*Leakage Suppression in Stripline Circuits Using a 2-D Photonic Bandgap Lattice*," Microwave Symposium Digest, Jun. 13, 1999; pp. 73-76; XP010343545. ISBN: 0-7803-5135-5.

Bindu M. Karyamapudi et al., "*Coplanar Waveguide Periodic Structures with Resonant Elements and Their Application in Microwave Filters*," Microwave Symposium Digest, Jun. 8, 2003; pp. 1619-1622; XP010746770. ISBN: 0-7803-7695-1.

Mehmet Ozgur et al., "*Characterization of Micromachined CMOS Transmission Lines for RF Communications*," ISCAS '98, May 31, 1998; pp. 353-356; XP010289448. ISBN: 0-7803-4455-3.

Noda et al., IEEE Journal of Quantum Electronics, vol. 38, No. 7, Jul. 2002. pp. 726-735.

Laso et al., IEEE Microwave and Guided Wave Letters, vol. 10, No. 6, Jun. 2000, pp. 220-222.

Notomi et al., IEICE Trans. Electron., vol. E85-C, No. 4, Apr. 2002. pp. 1025-1031.

* cited by examiner

*Primary Examiner*—Kianni C Kaveh
(74) *Attorney, Agent, or Firm*—Muncy, Geissler, Olds & Lowe, PLLC

(57) ABSTRACT

A device for application in the high frequency field and a method for forming a photonic band-gap structure are provided. The device being mountable on a primary substrate for forming the device. The device being formed by forming conformal coplanar waveguide metallizations on surface areas of two substrates, connecting the conformal coplanar waveguide metallizations of the two substrates, and structured back-etching of the two substrates, starting at surface areas of the two substrates that are opposite the coplanar waveguide metallizations.

10 Claims, 5 Drawing Sheets

METHOD FOR FORMING A PHOTONIC BAND-GAP STRUCTURE AND A DEVICE FABRICATED IN ACCORDANCE WITH SUCH A METHOD

This nonprovisional application claims priority under 35 U.S.C. § 119(a) on German Patent Application No. DE 102004022140.5, which was filed in Germany on May 5, 2004, and which is herein incorporated by reference.

BACKGROUND OF THE INVENTION

1. Field of the Invention

The present invention relates to a method for forming a photonic band-gap structure (PBG structure) on a substrate and a device having a photonic band-gap structure that is fabricated according to such a method for application in, for example, microwave and/or millimeter wave technology, that is, in the high frequency field.

Although applicable to any passive device, the present invention and the problems it is based on are described hereinbelow in regard to microwave and millimeter wave filters and electromagnetic hollow cavities, that is, micro cavities.

2. Description of the Background Art

There is generally much interest in transmitting and guiding electromagnetic waves for a wide range of application, for example, in the fields of cordless telecommunication, motor vehicles, and aircraft radar equipment.

Intensive research is currently being done with photonic band-gap structures (PBG structures) in the field of optical applications as well as applications in the microwave and millimeter frequency field. An electromagnetic band gap (EBG), which is also referred to as a photonic band-gap crystal (PBC) or as an electromagnetic crystal structure (ECS), includes a periodic array of inclusions in a material, which form a stop-band for defined frequency ranges. Photonic crystals, or PBG structures, are processed materials with periodic spatial variations of the dielectric constant. Based on a Bragg reflection, electromagnetic waves having defined frequency ranges cannot pass through the photonic crystal and, therefore, no resonant modes can occur. These frequency intervals are referred to as photonic band gaps. The energy does not spread in predefined directions within this stop band. In other words, photonic crystals are artificial crystal structures that have an effect on electromagnetic waves that is similar to the effect a semiconductor crystal has on electronic waves. An EBG defect is, as described above, an interference in the EBG lattice structure, whereby the defect may be realized by inclusion or absence of an atom or a molecule, in an otherwise periodic lattice. A defect such as this creates a narrow pass-band frequency range within the larger stop-band frequencies. The quality of the defect defines the width of this pass-band range. The field of periodic electromagnetic materials is currently one of the fastest-developing areas in electromagnetic technology. Periodic structures, for example, photonic crystals, can control the spreading of electromagnetic waves in ways that were unknown until recently.

Application possibilities for such PBG structures are microwave appliances, antennae, optical lasers, filters, resonators etc. For example, the quality factor of a cavity resonator is determined on a dielectric basis for a resonant mode by two loss mechanisms, namely, dielectric losses due to the dielectric materials that are used and metallic losses due to surface currents in the metallizations.

It is thus generally desirable to realize an integrated planar EBG, that is, a PBG structure for high frequency applications, that is, applications in the microwave and millimeter wave fields with minimal power dissipation.

A conventional approach exists, wherein a patterned metallic-dielectric and dielectric EBG structure for forming a high-quality resonator for microwave applications is provided. Conventional methods for producing such a resonator are costly and the components of the resulting structures are big in size and are not compatible with silicon-based technologies for the fabrication of integrated semiconductor circuits. However, silicon-based technologies have proven to be particularly beneficial so that future structures should be silicon-compatible ones.

In a further conventional approach, PBG structures are used for producing filters by utilizing patterned coplanar metallizations, or microstrip metallizations. The reduction of the filter size in such structures results in greater LC constants.

The disadvantage of this approach, however, has proven to be the fact that with these methods, components are constructed that can only be used in filter applications and not, for example, in micro-cavity applications for resonators. Furthermore, the structure of devices such as these requires several periods of artificial cells of electromagnetic crystals equal to half the wavelength of the signal. This results in big dimensions of the produced devices.

SUMMARY OF THE INVENTION

It is therefore an object of the present invention to provide a fabrication method for a PBG structure and a device having a PBG structure fabricated in accordance with such method, whereby the PBG structure and a reliable device both for filter and for micro-cavity applications can be produced simply and cost-effectively, whereby smaller dimensions are thus realized.

The present invention is based on the idea to provide a compatible PBG, that is, EBG structure for use in planar technology based on silicon substrates, by using a coplanar waveguide metallization on a substrate with periodically alternating substrate areas and air gaps. This structure is suitable for both microwave filters and micro cavities. The method of the present invention for forming a photonic band-gap structure can include the following steps: forming conformal coplanar waveguide metallizations on the surfaces of two substrates; linking the conformal coplanar waveguide metallizations of the two substrates; and structured back-etching of the two substrates beginning at the surfaces of the two substrates opposing the coplanar waveguide metallizations.

Thus, a PBG structure is beneficially formed in a simple and cost-effective way, which can be used for producing a device for application in the high frequency field. Because the coplanar waveguide metallizations guide the electromagnetic waves and are constructed by a standard metallization procedure, and because the substrates can be etched with suitable patterns in a simple and cost-effective way by using conventional etching procedures, a device is provided that is cost-efficient and easy to make. In addition, the size of the device for filters in the microwave and millimeter wave fields and for micro cavities, that is, micro hollow areas, can be reduced. Furthermore, the constructed device is applicable for and compatible with silicon-based technology.

In an example embodiment, prior to applying the coplanar waveguide metallizations, additional layers, preferably dielectric insulating layers, are formed on a respective area of the two substrates and are removed from the back-etched areas when the structured back-etching of the substrates is completed.

In a further example embodiment, the two substrates can be structured back-etched for forming periodically arrayed vertical substrate areas, that is, periodically arranged vertical trenches between the substrate areas. The two substrates can thereby be back-etched by using an anisotropic wet chemical etching procedure with, for example, a KOH solution or, alternatively, an ASE (advanced silicon etching) procedure. These methods are cost-effective and expeditious etching procedures. Preferably, the two substrates are back-etched by the etching procedure for forming vertical trenches having a high aspect ratio.

In a further example embodiment, the coplanar waveguide metallizations can be formed, either linear or meander-shaped, over the respective dielectric insulating layers of the two substrates by a standard metallization procedure. Since the coplanar waveguide metallizations guide the electromagnetic waves and can be structured in a meander shape, in a simple way, the dimensions of, for example, filters and resonators can be considerably reduced.

The two coplanar waveguide metallizations of the initially separated substrates can be interconnected by using a microwave heat treatment. The respective wave guides are thereby conformal to one another and can be connected to be flush with one another such that a robust and compact structure is achieved. It goes without saying that other connection methods and means for connecting the two substrates, that is, the two waveguide metallizations, can be used.

In yet another embodiment, after connecting the coplanar waveguide metallizations, a desired PBG structure can be cut from the formed device with an appropriate tool. The PBG structure can thereby be constructed as a filter for application in the microwave and/or the millimeter wave fields, that is, in the high frequency field. Alternatively, the PBG structure can be constructed as a hollow cavity, that is, a micro cavity, also for application in the microwave and/or millimeter wave fields, that is, in the high frequency field, whereby in contrast to the filter structure, at least one periodic vertical substrate area of the PBG structure is removed for forming the micro cavity.

The custom-cut PBG structure can be, at least partially, inserted in a back-etched groove of a primary substrate and attached therein, or thereon, using a suitable bonding material. In this way, a device for application in the high frequency field is constructed in a simple manner.

The two substrates as well as the primary substrate can be composed of a silicon semiconductor or a similar semiconductor material. The dielectric insulating layers are preferably made of an inorganic insulation material, for example, silicon oxide, particularly silicon dioxide, silicon nitride, silicon having air gaps, or the like. The coplanar waveguide metallizations are preferably made of aluminum, copper, silver, gold, titanium, or the like. It goes without saying that materials of different compositions can also be utilized for the aforementioned devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1*a*-2 to 1*e*-1 are cross-sectional views of a PBG structure in various method steps to illustrate the individual steps of the method of the present invention in accordance with an example embodiment of the present invention;

FIGS. 1*e*-2 is a top view of a PBG structure of FIGS. 1*e*-1 in accordance with an example embodiment of the present invention;

FIG. 2-1 is a cross-sectional view of a primary substrate having a back-etched groove according to an example embodiment of the present invention;

FIG. 2-2 is a top view of the primary substrate of FIG. 2-1 having a back-etched groove;

DETAILED DESCRIPTION

Figures 1, 1A:
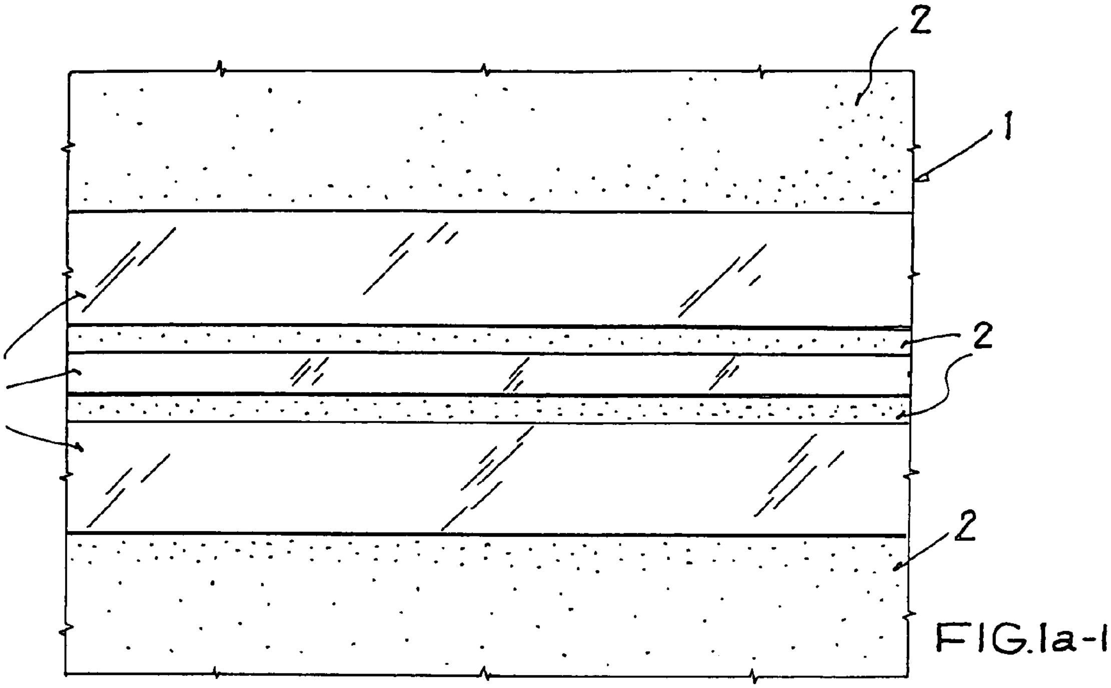
FIG. 1*a*-1 is a top view of a coplanar waveguide metallization on a substrate having a dielectric insulating layer.

Identical reference numerals in the figures designate substantially identical components, or components with substantially identical functions, unless indicated otherwise.

With reference to FIGS. 1*a*-1 to 1*e*-2, the individual method steps for producing a PBG structure in accordance with an example embodiment of the present invention are described in detail.

Figures 1, 1A, 2:
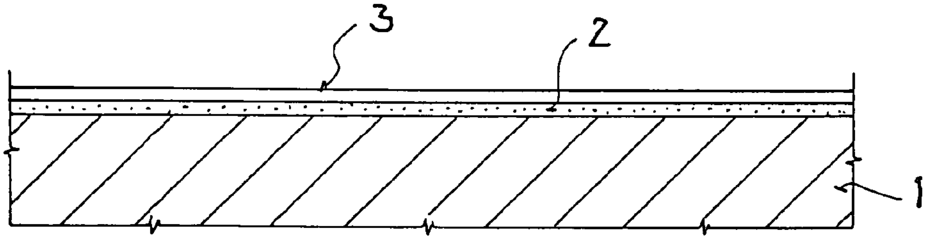

FIG. 1*a*-1 illustrates a top view and FIG. 1*a*-2 is a cross-sectional view of a substrate 1, on which a barrier layer, for example, a dielectric insulating layer 2, is formed. The dielectric insulating layer 2 can be, for example, 300 nm thick and can be made of silicon nitride or silicon dioxide. It will be obvious to one skilled in the art that other dielectric insulation materials can also be used. Furthermore, it is also noted that, the barrier layer 2 can also be omitted.

In a subsequent step, a structured coplanar waveguide metallization 3 is formed over the dielectric insulating layer 2 using, for example, a conventional metallization procedure. An exemplary structure comprised of three conductors that are arranged in parallel to one another can be particularly seen in the top view of FIG. 1*a*-1 and the cross-sectional view of FIG. 1*a*-2. For example, the coplanar waveguide metallization 3 is comprised of a concentric signal conductor and two thicker mass conductors, which are respectively arranged in parallel to the signal conductor, each being separated from one another by a dedicated area of the dielectric insulating layer 2.

A requirement for metallization materials is in having the lowest possible electrical resistance. Furthermore, the material should have good adhesive properties and should not bring about any uncontrollable alloy processes when coming in contact with the substrate 1, that is, the dielectric insulating layer 2. Therefore, high-conductive materials, particularly aluminum, copper, silver, gold, titanium, platinum, or the like are used. Due to its uncomplicated processability, aluminum is a particularly suitable material for coplanar waveguide metallizations.

Thus, two structures that are processed as described above, each have a substrate 1, or 1', a dielectric insulating layer 2, or 2', and a structured coplanar waveguide metallization 3, or 3', are formed. The coplanar waveguide metallizations 3 and 3' of the two carrier substrates 1 and 1' are preferably formed conformal to one another.

Figure 1B:
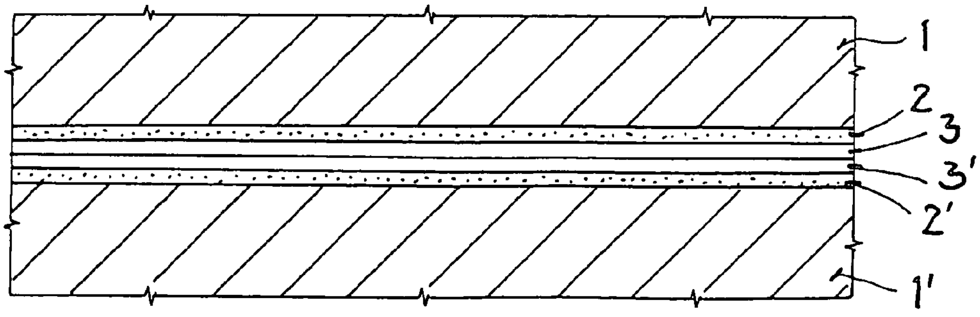

Next, as illustrated in FIG. 1*b*, the two substrates 1 and 1' and their processed surfaces are connected with one another such that the conformal coplanar waveguide metallizations 3 and 3' are arranged flush on top of each other and are tightly interconnected. Such a connection can, for example, be executed with a microwave heat process, which tightly bonds, that is, connects the two metallizations 3 and 3'. The structures composed of the two carrier substrates 1 and 1' are pressed together in a suitable manner and are exposed to a suitable microwave radiation. Most of the electromagnetic energy appears within skin depth, that is, on the surface of the metallization. Thus, heat is generated in the areas that are to be bonded. Such a microwave technique can be applied for an extended period of time, for example, several hours, whereby a stable structure according to FIG. 1*b* is produced.

Figure 1C:
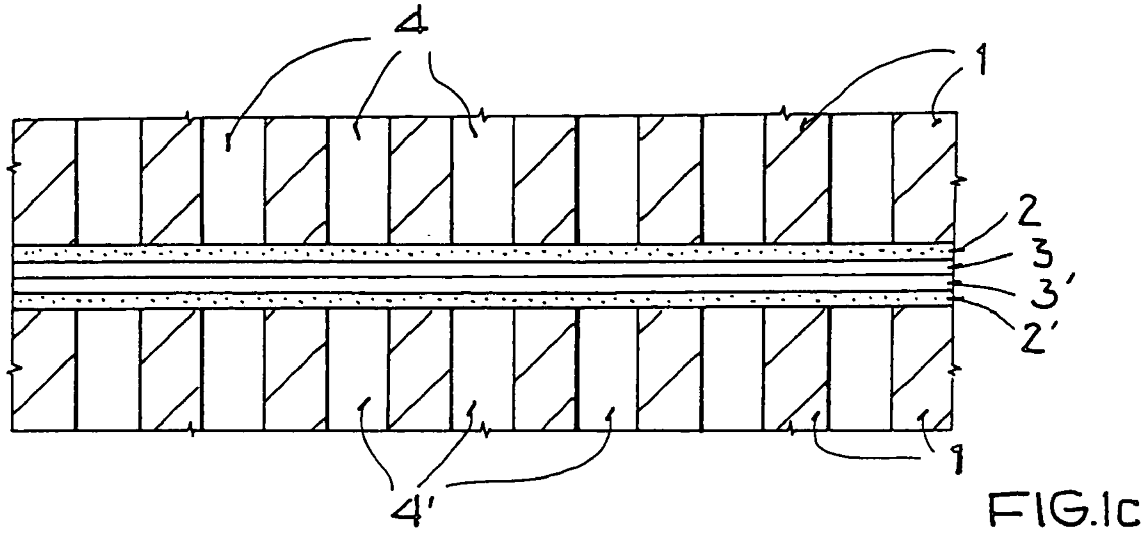

In a subsequent method step, as illustrated in FIG. 1*c*, the two substrates 1 and 1' are back-etched starting at their free surfaces, that is, the surfaces opposite the metallizations 3 and 3', in order to form preferably vertical and periodically arranged trenches 4 or 4', between remaining substrate areas. To form the vertical and deep structures according to FIG. 1*c*, two etching methods are particularly well suited.

As a simple conventional method, an anisotropic wet chemical etching procedure using an etching agent, for example, a KOH solution, can be utilized. Due to the anisotropy of this anisotropic wet chemical back-etching, the vertical trenches 4, or 4', in FIG. 1*c* are formed having a high aspect ratio. For the structured etching procedure, a silicon nitride layer, for example, can be deposited on the free surfaces of the substrate 1 and the substrate 1', and by using a conventional method can be patterned for the subsequent etching. This can be done by a conventional photolithographic process, for example.

A further beneficial etching method is Advanced Silicon Etching (ASE). With such an ASE method, vertical trenches 4, or 4', can also be etched in the two substrates 1 and 1' in a simple manner. Once again, a suitable etching solution can also be utilized.

As can be seen in FIG. 1*c*, the dielectric insulating layer 2, or 2', serves as a protection of the metallizations 3 and 3' from the etching agents during the above-described etching processes.

Figure 1D:
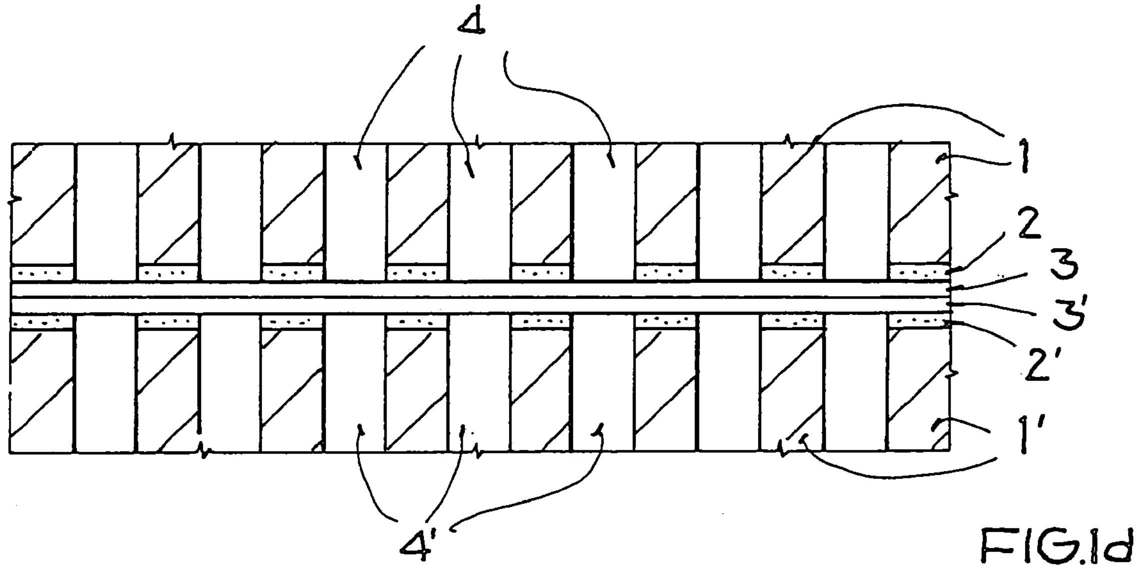

In a subsequent method step, the unprocessed areas of the dielectric insulating layers 2 and 2' in the back-etched substrate areas 4 and 4' are removed using a dry etching procedure, for example, thus producing the structure that is illustrated in FIG. 1*d*.

Figures 1, 1E:
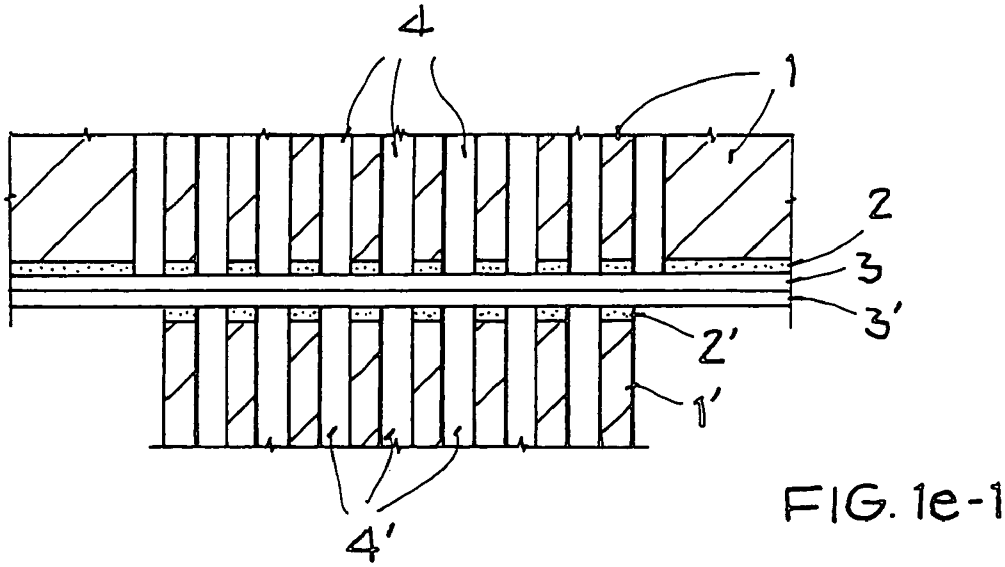
Figures 1, 1E, 2:
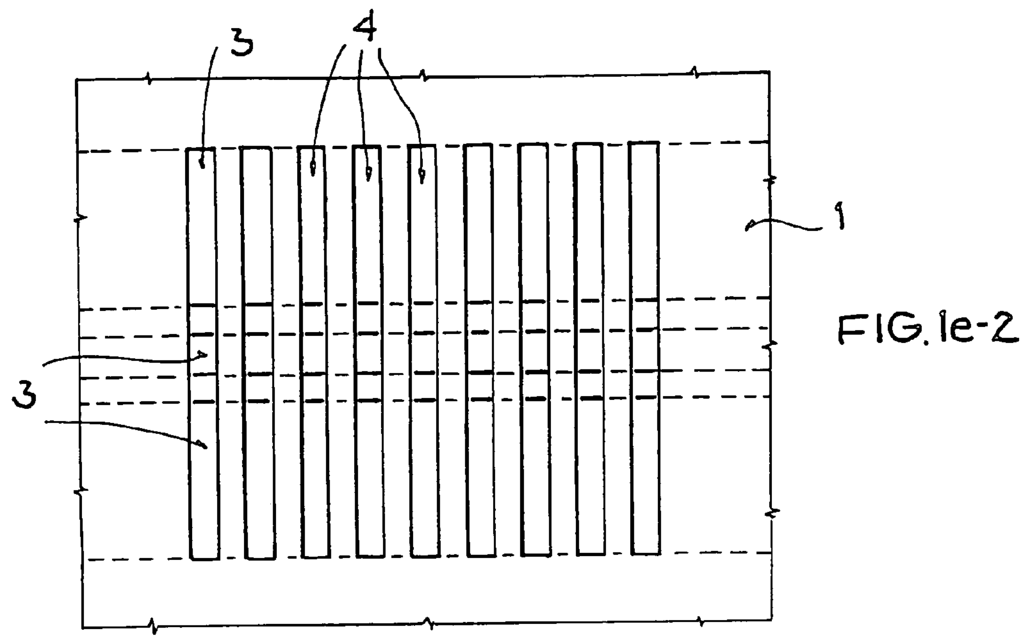
Figures 1, 2:
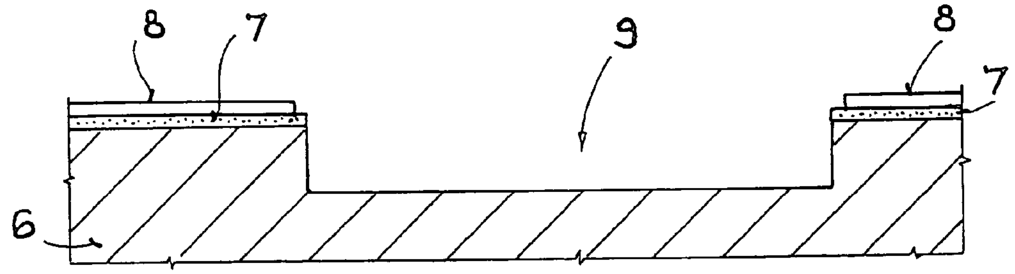
Figure 2:
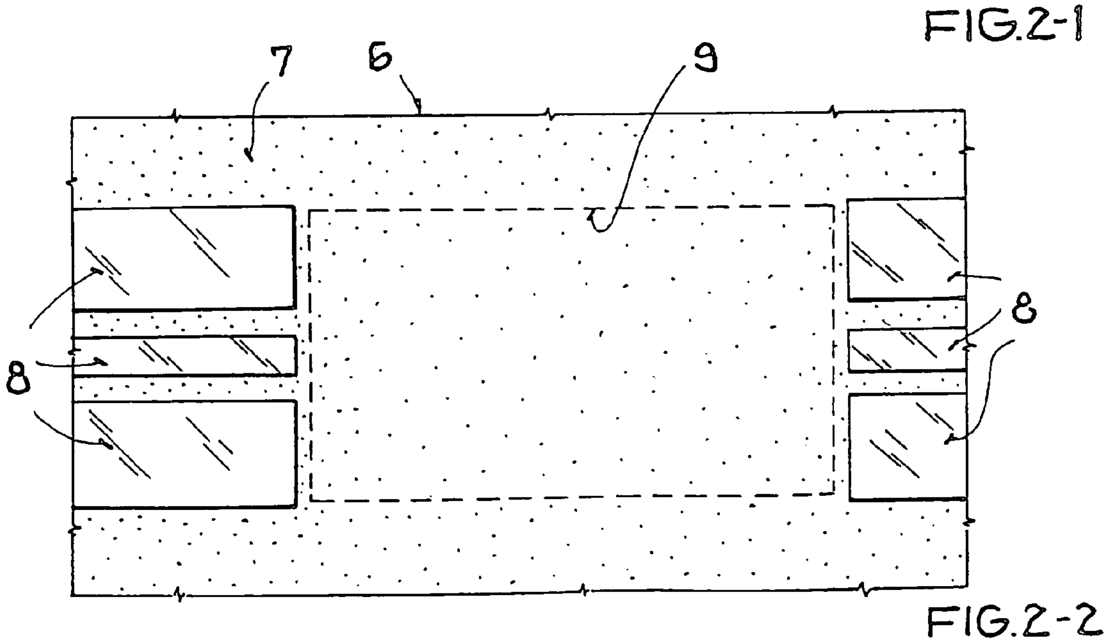

Lastly, as illustrated in FIG. 1*e*-1, the structure of FIG. 1*d* is cut to suit a particular requirement using an appropriate tool. The mold illustrated in FIG. 1*e*-1, for example, is suitable for the use of a device as a filter. In order to use the device for a micro cavity, that is, a micro hollow area, at least one vertical substrate area on both sides of the structure would be completely removed, as is described in more detail further below.

FIG. 1*e*-2 is a top view of the fabricated PBG structure of FIG. 1*e*-1.

In this way, a PBG structure according to an embodiment of the present invention has been constructed in a simple and cost-efficient way following the method steps of FIG. 1*a*-2 to FIG. 1*e*-1, whereby the metallizations 3 and 3', which guide the electromagnetic waves, are embedded in a periodic array of substrate areas, whereby the substrate areas are periodically separated from one another by respective air gaps.

As has been previously described, the PBG structure that is fabricated in this way is suitable for silicon-based technologies. Therebelow, an integration of the previously fabricated PBG structure in a silicon primary carrier, that is, a silicon primary substrate 6, is described in detail. FIG. 2-1 illustrates a cross-sectional view, and FIG. 2-2 is a top view of a primary substrate 6, preferably also a silicon substrate. The primary substrate 6 preferably also has a structured coplanar waveguide metallization 8, which preferable is constructed conformal to the coplanar waveguide metallizations 3 and 3' of the previously formed PBG structure.

As is further shown in FIG. 2-2, the primary substrate 6 is provided with an insulating layer 7 between the coplanar waveguide metallization 8 and the primary substrate 6, which preferably is made of the same material as the dielectric insulating layers 2 and 2' of the carrier substrates 1 and 1'.

Furthermore, as is illustrated in FIG. 2-1, the primary substrate 6 preferably has a groove 9 that is back-etched using a conventional etching method. Again, a standard anisotropic wet chemical etching procedure using a KOH solution, or an ASE etching method can be used to back-etch the primary substrate 6 to form the groove 9.

Figure 3:
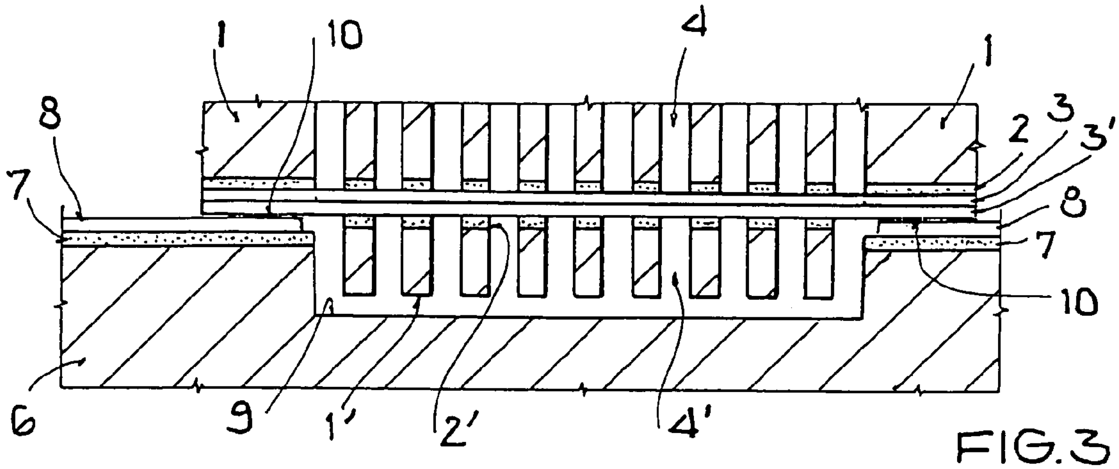
FIG. 3 is a cross-sectional view of a filter device according to an embodiment of the present invention.

FIG. 3 illustrates a cross-sectional view of a PBG structure, which is inserted, at least in part, in the groove 9 of the primary substrate 6 with the aid of suitable bonding agents 10, and which via the bonding agents 10 is mounted on the primary substrate 6 such that the coplanar wave guide metallizations 3 and 3', respectively, are at least partially connected to the conformal metallizations 8 of the primary substrate 6. The periodic structure illustrated in FIG. 3 can be used, for example, as a filter in the high frequency field, that is, in the microwave and millimeter wave fields.

Figure 4:
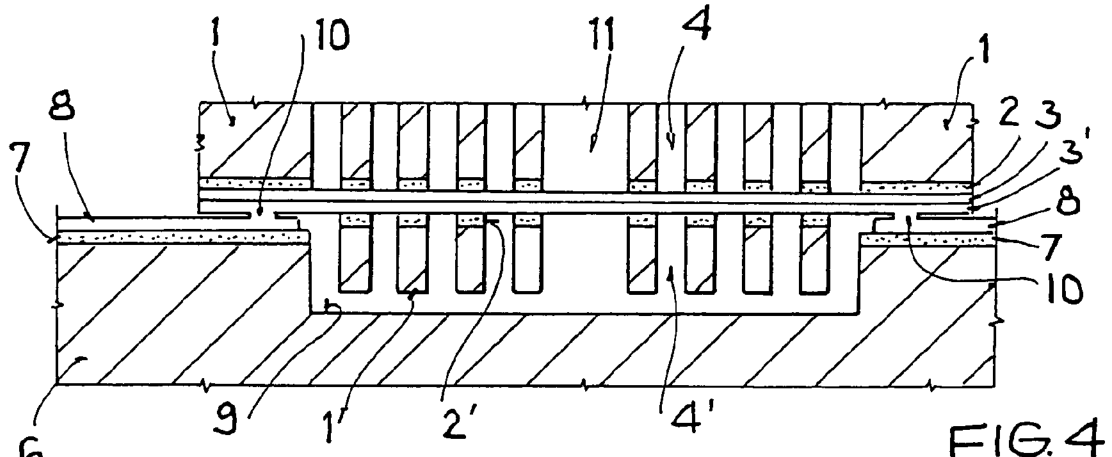
FIG. 4 is a cross-sectional view of a microcavity device according to an embodiment of the present invention.

FIG. 4 illustrates a cross-sectional view of an additional device according to a further embodiment of the present invention, whereby, in contrast to the device of FIG. 3, at least one periodic substrate area of the PBG structure is completely removed. In this way, the hollow area, that is, the micro cavity 11 as is illustrated in FIG. 4 is formed for producing a device, which is suited, for example, for resonators or for a micro cavity, that is, micro hollow cavity applications in the high frequency field, such as, in the microwave and millimeter wave fields.

The PBG structure is mounted on the primary substrate 6, analogous to the manner described in the previous embodiment of FIG. 3, and is partially inserted in the groove 9.

Therefore, the only difference is the removal of at least one periodic cell from the filter structure illustrated in FIG. 3.

Figure 5:
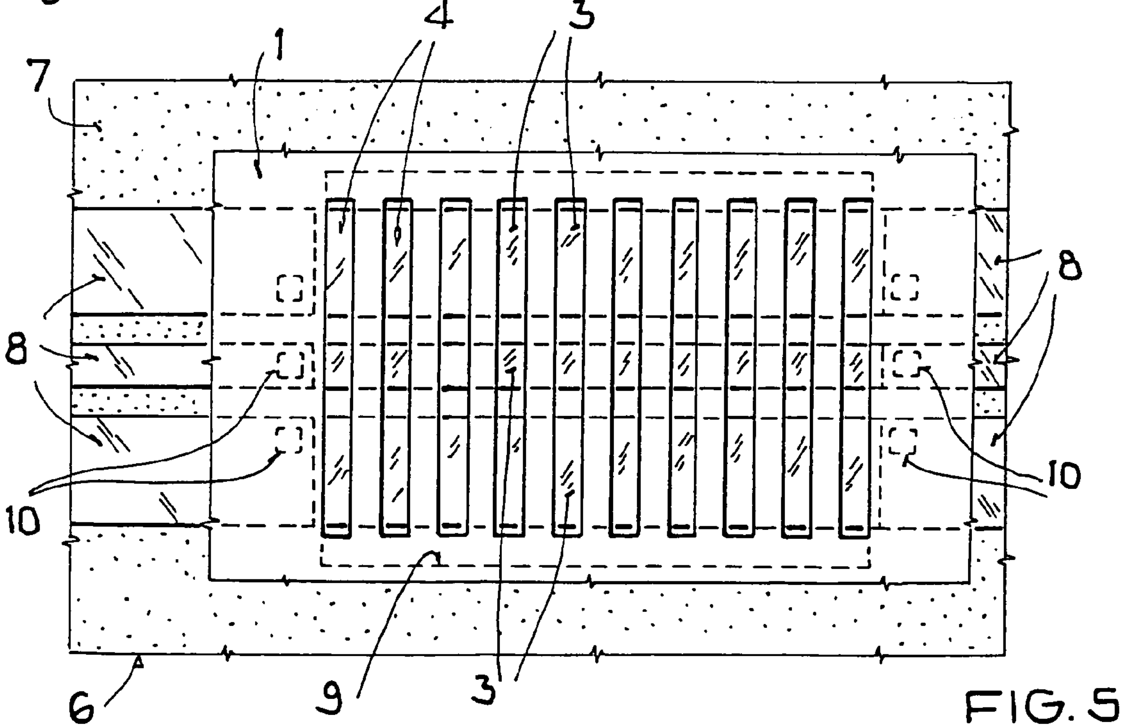
FIG. 5 is a top view of a device having linear coplanar waveguide metallizations according to an embodiment of the present invention.

FIG. 5 illustrates a top view of a device of FIG. 3 according to a preferred embodiment of the present invention. As is shown in FIG. 5, the coplanar waveguide metallizations 3 and 3' of the PBG structure and the primary substrate 6 run linear and conformal to one another.

With a construction such as this, for example, a two-layer PBG structure having a dielectric constant of 1 (equal to the dielectric constant of air) and a dielectric constant of 13 (equal to the dielectric constant of gallium arsenide or roughly the dielectric constant of silicon) would have a period length, that is, a period of air and silicon in the structure illustrated in FIG. 5, which would translate into approximately 333 μm at an assumed resonance frequency of 18 GHz.

Figure 6:
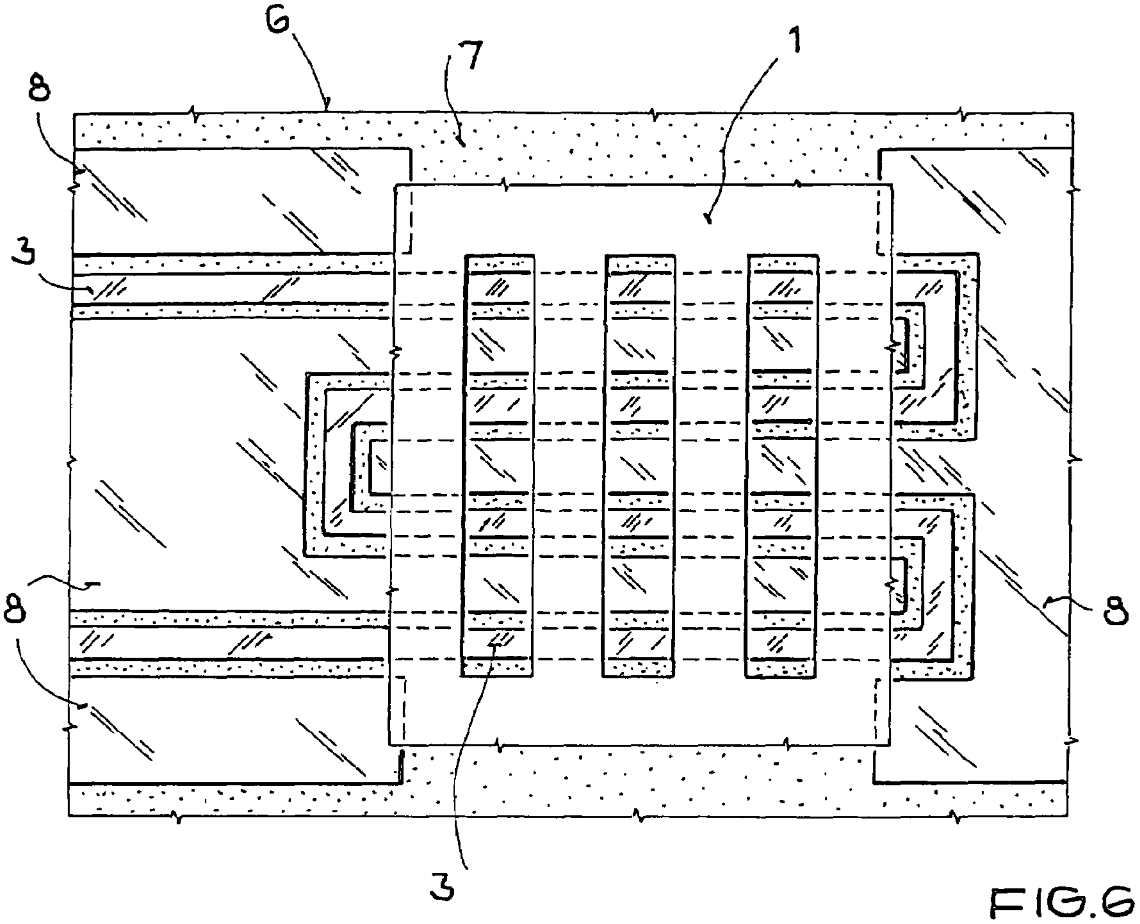
FIG. 6 is a top view of a device having meander-shaped coplanar waveguide metallizations according to a further embodiment of the present invention.

FIG. 6 illustrates a top view of a device according to a further preferred embodiment of the present invention, which requires a smaller silicon surface, thus providing a higher integration density. According to the instant embodiment, both the metallizations 8 of the primary substrate 6 and the metallizations 3 and 3' of the PBG structure extend in a meandrous shape, as is illustrated in FIG. 6. As a result, the dimensions of the device can be substantially reduced and the compatibility with silicon-based technologies can be increased.

With the production method of the present invention, a device for use in the high frequency field is constructed, for example, a filter or a micro cavity, which in comparison with conventional methods provides a higher integration density, a simpler and more cost-effective production method and a higher quality factor because a compact and low-loss structure is formed due to the reduced height and the planar construction. Furthermore, the simply constructed PBG structures are integratable with silicon-based technologies.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising: a primary substrate having a back-etched groove; and a photonic band-gap structure having two interconnected parts, each comprising a substrate, conformal coplanar waveguide metallizations in a junction segment and structured back-etched substrate areas in an exposed segment, wherein the coplanar waveguide metallizations of the two interconnected parts are connectable to one another to form the photonic band-gap structure, and wherein the photonic band-gap structure is at least partially insertable in the back-etched groove of the primary substrate.

2. The device according to claim 1, wherein the structured back-etched substrate areas of the photonic band-gap structure form periodically arranged vertical substrate areas.

3. The device according to claim 1, wherein the coplanar waveguide metallizations are linear and/or meander-shaped.

4. The device according to at least one of claim 1, wherein the photonic band-gap structure is a filter for application in the microwave and/or millimeter wave fields, which are in a high frequency field.

5. The device according to claim 1, wherein the photonic band-gap structure is formed as a hollow cavity or a micro cavity, for application in the microwave and/or millimeter wave fields, which are in a high frequency field, and wherein at least one periodic substrate area of the photonic band-gap structure is removable for forming the hollow cavity.

6. The device according to claim 1, wherein the two substrates and the primary substrate are silicon substrates.

7. The device according to claim 1, wherein the coplanar waveguide metallizations are made of aluminum, copper, silver, gold, or titanium.

8. The device according to claim 1, wherein, via a bonding agent, the photonic band-gap structure is mountable on a rim segment of the groove of the primary substrate such that the photonic band-gap structure is at least partially inserted in the groove of the primary substrate.

9. The device according to claim 1, wherein the device is used in microwave and/or millimeter wave fields, which are in a high frequency field.

10. A method, comprising:

forming a back-etched groove in a primary substrate;

forming a photonic band-gap structure having two interconnected parts, each comprising a substrate, conformal coplanar waveguide metallizations in a junction segment and structured back-etched substrate areas in an exposed segment, wherein the step of forming includes connecting the coplanar waveguide metallizations of the two interconnected parts to form the photonic band-gap structure; and at least partially inserting the photonic band-gap structure in the back-etched groove of the primary substrate.

* * * * *